US007980926B2

(12) United States Patent
Neumann et al.

(10) Patent No.: US 7,980,926 B2
(45) Date of Patent: Jul. 19, 2011

(54) DEVICE AND METHOD FOR THE AUTOMATED PROCESSING OF MEAT

(75) Inventors: Ralf Neumann, Klempau (DE); Torsten Rusko, Herrenburg (DE); Ulrich Gutte, Bad Oldesloe (DE)

(73) Assignee: Nordischer Maschinenbau Rud. Baader GmbH + Co KG, Lubeck (DE)

( * ) Notice: Subject to any disclaimer, the term of this patent is extended or adjusted under 35 U.S.C. 154(b) by 0 days.

(21) Appl. No.: 10/590,774

(22) PCT Filed: Jan. 28, 2005

(86) PCT No.: PCT/EP2005/000997
§ 371 (c)(1),
(2), (4) Date: Aug. 25, 2006

(87) PCT Pub. No.: WO2005/082152
PCT Pub. Date: Sep. 9, 2005

(65) Prior Publication Data
US 2008/0045131 A1 Feb. 21, 2008

(30) Foreign Application Priority Data
Feb. 27, 2004 (DE) .................... 10 2004 010 696

(51) Int. Cl.
*A22C 25/16* (2006.01)
*A22C 25/18* (2006.01)

(52) U.S. Cl. ........................ 452/163; 452/161

(58) Field of Classification Search ............... 452/127, 452/135, 149, 152, 153, 160–163
See application file for complete search history.

(56) References Cited

U.S. PATENT DOCUMENTS

| 1,669,207 | A | * | 5/1928 | Oscar | 452/149 |
| 4,466,344 | A | * | 8/1984 | Schill | 452/127 |
| 5,250,005 | A | * | 10/1993 | Matthiasson et al. | 452/108 |
| 5,350,334 | A | * | 9/1994 | Holms | 452/127 |
| 5,611,727 | A | * | 3/1997 | Dufour et al. | 452/153 |
| 5,830,052 | A | | 11/1998 | Wadsworth | |
| 6,213,863 | B1 | * | 4/2001 | Basile et al. | 452/127 |
| 6,231,436 | B1 | * | 5/2001 | Bakker | 452/188 |
| 2003/0114097 | A1 | * | 6/2003 | Markert et al. | 452/160 |
| 2003/0176158 | A1 | * | 9/2003 | Freund et al. | 452/149 |

FOREIGN PATENT DOCUMENTS

| DE | 2227830 | 12/1973 |
| WO | 01/32369 | 5/2001 |
| WO | 03/037090 | 5/2003 |

* cited by examiner

*Primary Examiner* — David J Parsley
(74) *Attorney, Agent, or Firm* — Mattingly & Malur, P.C.

(57) ABSTRACT

The invention relates to a device and a method for the automated processing of meat. Known devices comprise a transport element, a cutting element, a bearing layer for the cutting element, and at least one control and/or regulating device that is actively connected to the cutting element. According to known devices and methods, the meat is displaced onto or towards the bearing layer, before being cut and/or trimmed. Often, this leads to an accumulation of meat, interrupting the processing operation. The inventive threading element reliably ensures that the meat is lifted up before reaching the bearing layer and is guided onto the same.

10 Claims, 5 Drawing Sheets

DEVICE AND METHOD FOR THE AUTOMATED PROCESSING OF MEAT

Figure 1:
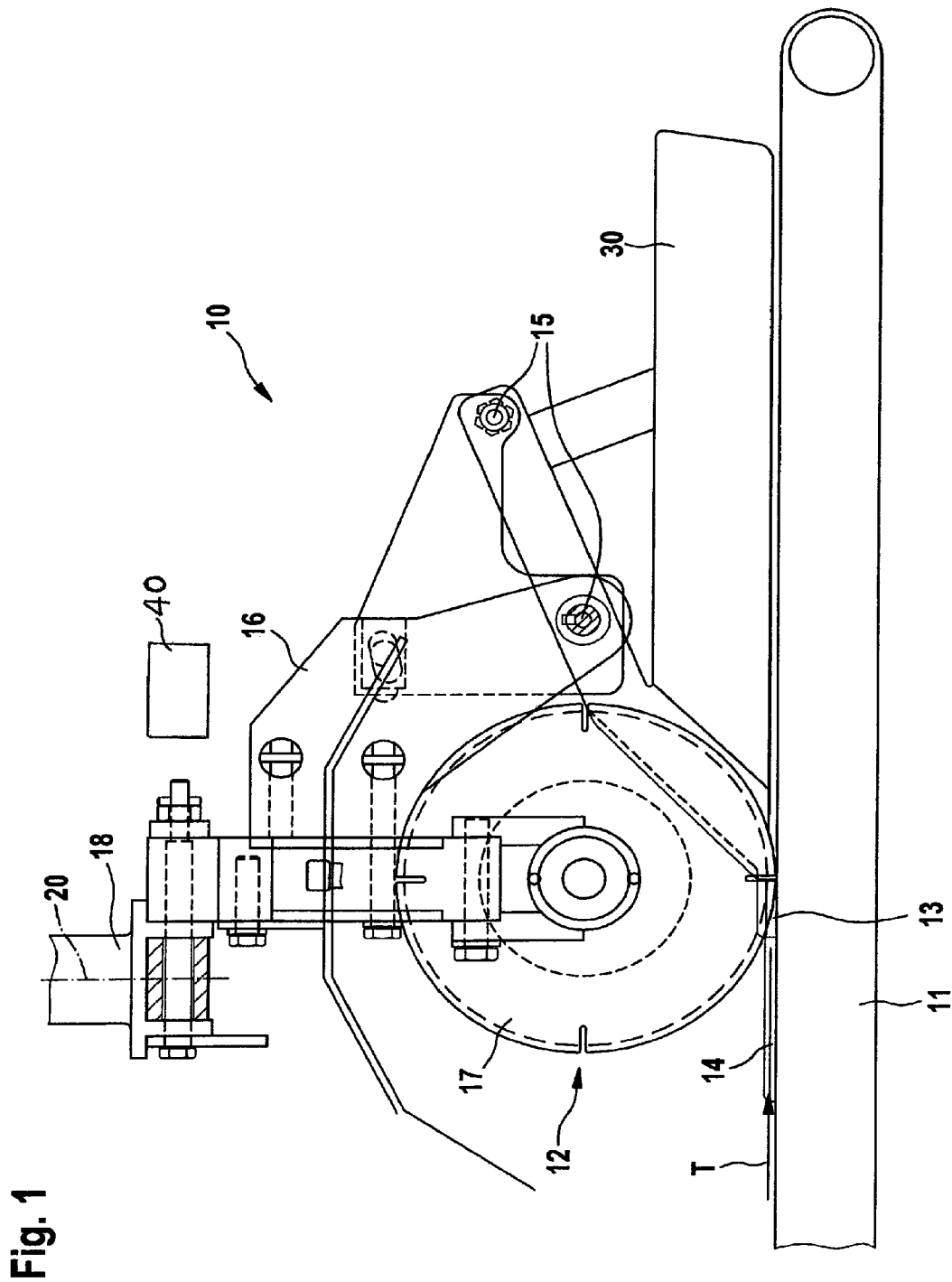

The invention relates to an apparatus for the automated processing of meat, comprising a transport element for transporting the meat, a cutting element for cutting and/or trimming the meat, a counter-surface for the cutting element and at least one control and/or regulating apparatus in functional connection with the cutting element. Furthermore, the invention is concerned with a method for the automated processing of meat, comprising the steps: transporting the meat into the area of the cutting element, running the meat up against a counter-surface before the meat reaches the cutting element, cutting and/or trimming the meat by means of the cutting element and removing the meat.

Apparatuses and method of this kind are used in particular in the meat and fish processing industry. Hereinafter processing of meat is to be understood as the processing of both mammals and birds and of fish. Apparatuses and methods with the features of the preambles of claims 1 and 10 are known from the prior art.

In particular in the processing of fish fillets for further processing, namely, e.g. in cutting into portions or in trimming to remove fatty areas, flecks of blood or the like, as described in WO 03/037090 A1, the fish fillets are conveyed on the transport element to the individual processing stations, amongst others the cutting element. The fish fillets run against or on to the countersurface positioned in front of the cutting element in the transport direction of the fish fillets and are then portioned and/or trimmed by the cutting element, which is moved into the appropriate cutting position by the control and/or regulating apparatus.

Apparatuses of this kind have the disadvantage, however, that the fish fillets impact against the counter-surface frontally and accumulate. This leads to interruption of the processing. Furthermore, the fish fillets may possibly also end up underneath the counter-surface with similar consequences to those just described. Precisely because the normally still damp fish fillets lie closely against and quasi adhere to the transport element or the like, the counter-surface cannot grip underneath the fish fillet, in order to guide it on to the counter-surface.

It is therefore the object of the present invention to create a compact apparatus which guarantees reliable cutting and/or trimming of meat, in particular fish fillets. Furthermore, it is the object of the present invention to propose a corresponding method.

This object is achieved by an apparatus with the initially mentioned features in that a threading element is arranged in the area of the cutting element, which is bent in respect of the counter-surface in the transport plane $E_1$ of the meat. The threading element and the angled construction or arrangement enable reliable "lifting on" of the meat to be processed, so that the meat, and in particular the fish fillet, can run securely and up against the counter-surface, where it is cut and/or trimmed by the cutting element. With this construction of the threading element prevents blunt impacting of the meat on the counter-surface. Instead, by means of the threading element acting laterally on the meat, the meat is continuously and increasingly "pulled" on to the counter-surface, or pushed through the transport element. Because of the bending of the threading element the meat impacts on the threading element at least partially with a lateral component, thus simplifying the insertion of the threading element under the meat. At the same time the effect that the edges or at least the belly side edge of the meat, and particularly also of the fish fillet, arches slightly upwards is taken advantage of, so the introduction of the thread aid under the fish fillet can be done particularly easily form the side.

The threading element is preferably an integral component of the counter-surface. This enables a particularly compact construction of the apparatus.

In a further preferred configuration of the invention a unit formed of counter-surface and threading element is constructed as swivellable. In this way the lateral engagement of the threading element is used to even greater effect, as the threading element can be brought out of a waiting or idle position into an operating or functional position.

The object is further achieved by a method with the initially mentioned steps, in that the meat is threaded by a threading element before running up against the counter-surface, the meat being at least partially lifted from the side and then guided on to the counter-surface. In this way reliable guiding of the meat on to the counter-surface and into the active area of the cutting element is achieved.

Figure 2:
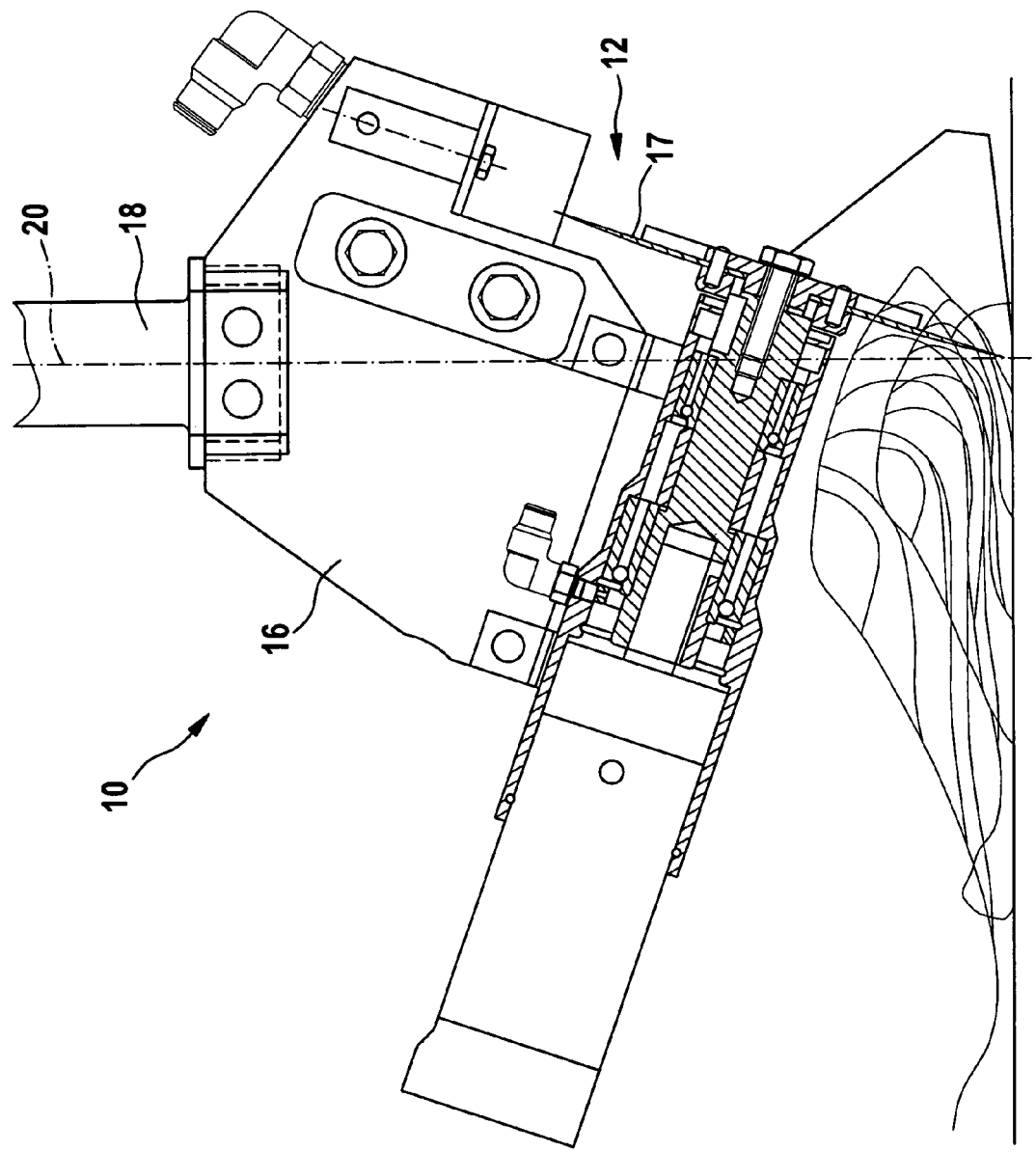
Figure 3:
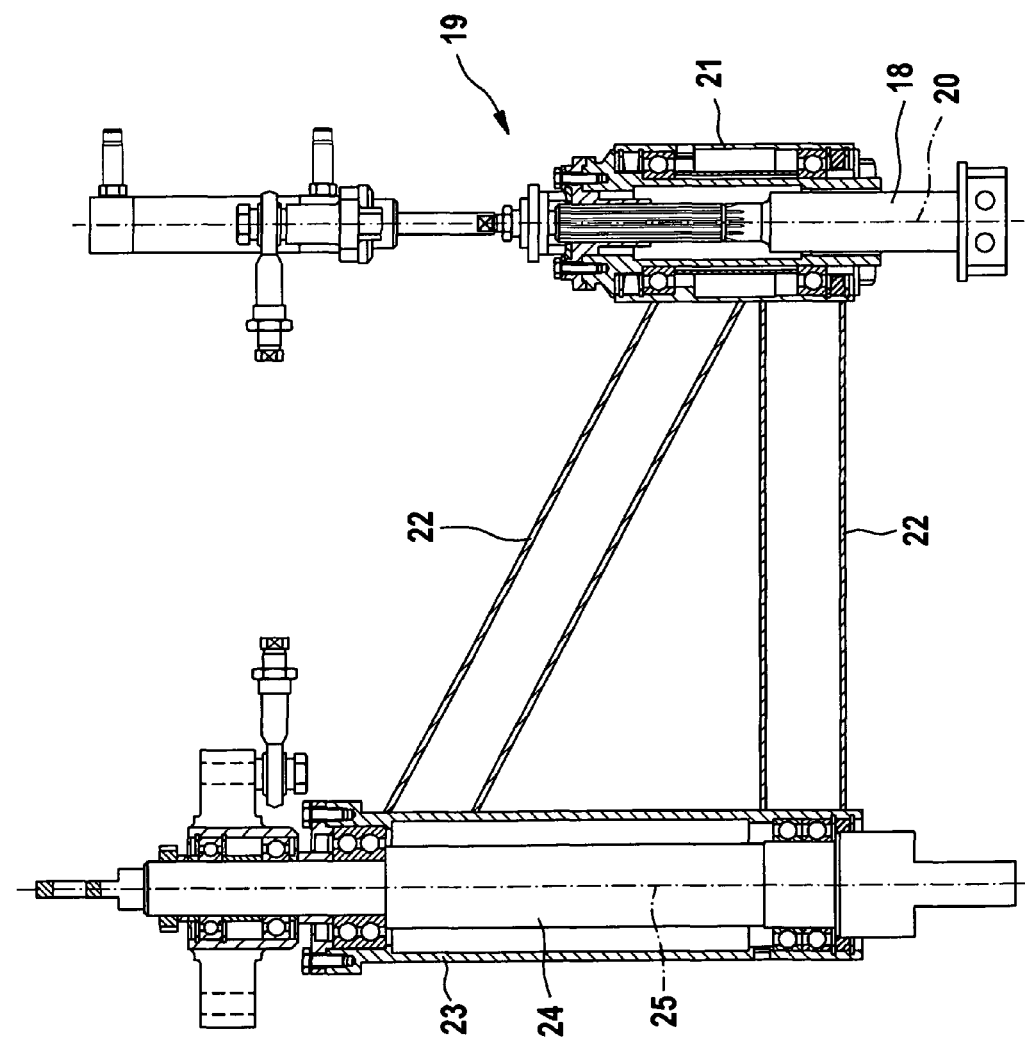
Figure 4:
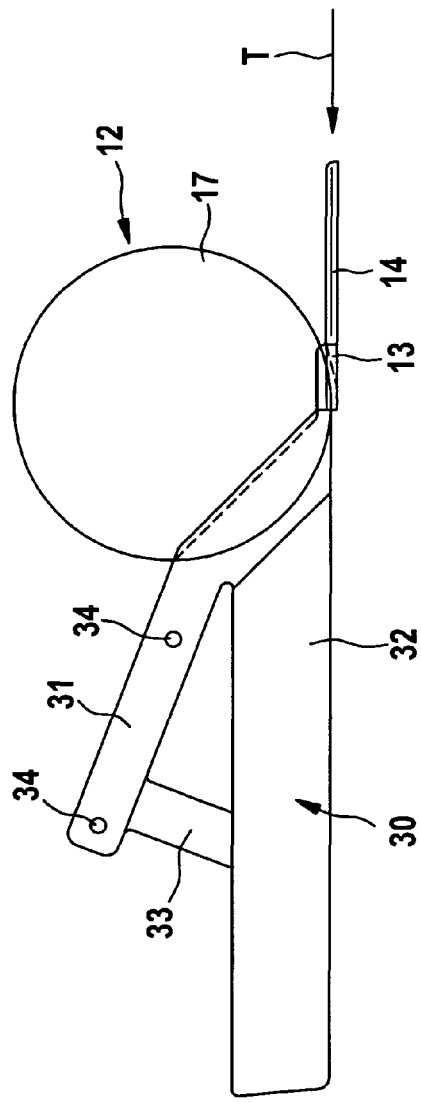
Figure 5:
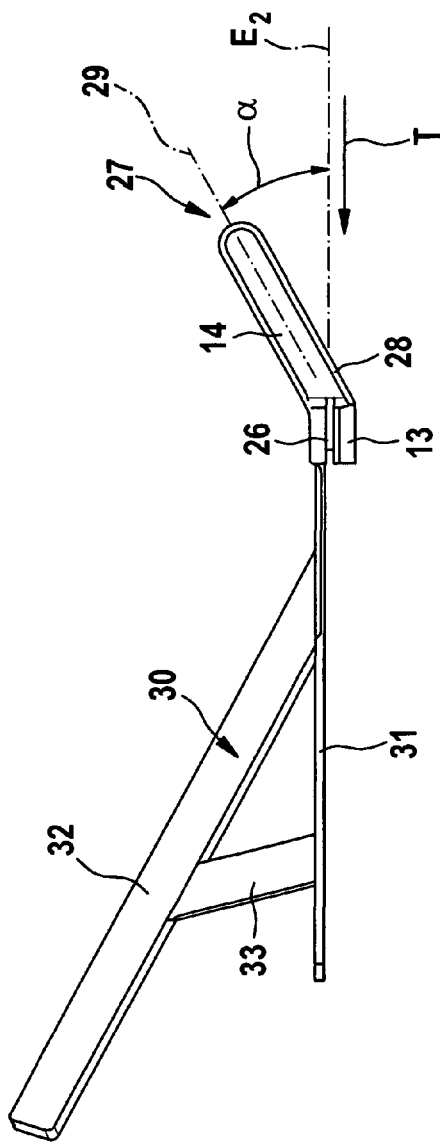
Figure 6:
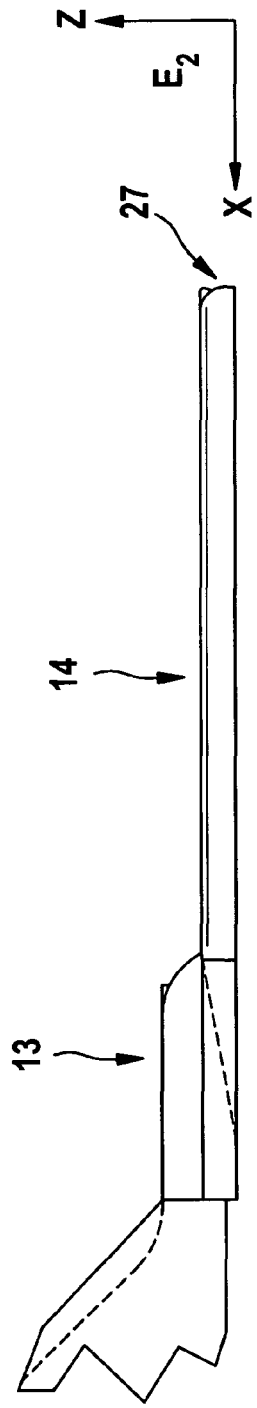
Figure 7:
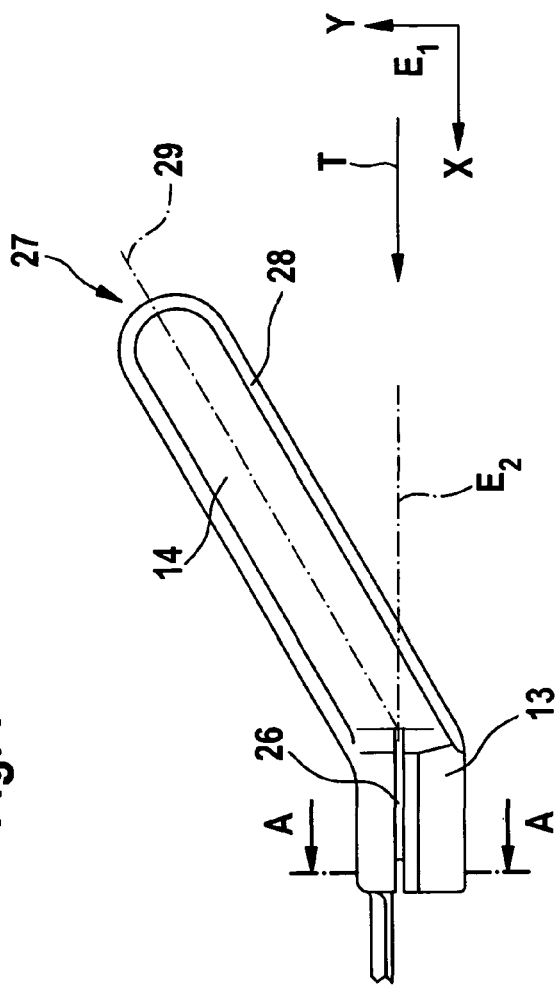
Figure 8:
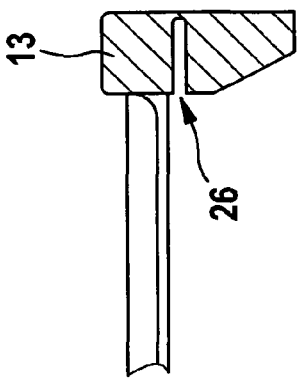

Further advantageous and preferred features and embodiments and method steps emerge from the subordinate claims and the description. A particularly preferred embodiment and the method are explained in greater detail using the attached drawings. In the drawings is shown:

FIG. 1 a schematic illustration of parts of the apparatus, namely of the cutting element with counter-surface and threading element, in side view, FIG. 2 the illustration according to FIG. 1 in front view, FIG. 3 a schematic illustration of the arrangement for swivelling the cutting element with counter-surface and threading element, FIG. 4 a schematic illustration of the counter-surface with threading element in side view, FIG. 5 the illustration according to FIG. 4 in horizontal projection, FIG. 6 an enlarged illustration of the counter-surface with threading element in side view, FIG. 7 the illustration according to FIG. 6 in horizontal projection, and FIG. 8 a sectional illustration according to section A-A in FIG. 7.

The described apparatus 10 can be used universally, namely in all plants and apparatuses suitable for processing meat. Particularly preferred is the use of the apparatus 10 in an overall apparatus for processing meat, as described, for example, in DE 199 81 456.2. From FIG. 1 an apparatus 10, or parts thereof, emerges, consisting essentially of a transport element 11 in the form of a conveyor belt for transporting the meat lying on the conveyor belt through the apparatus 10 in the transport direction (according to arrow T) from a processing or input station connection upstream (not illustrated) to a processing or output station arranged downstream (likewise not illustrated), a cutting element 12 for cutting and/or trimming the meat, a counter-surface 13 for cutting element 12 and at least one control and/or regulating apparatus 40 wherein the control and/or regulating apparatus is in functional connection with the cutting element 12. Apparatuses 10 of this kind serve for processing meat of all kinds, the description below relating as an example to the processing of fish or fish fillets.

The counter-surface 13 runs approximately parallel to the transport plane $E_1$ (spanned by X and Y coordinates as in FIG. 7) of the fish fillets and is arranged in the area of the cutting element 12. Additionally arranged in the area of the cutting element 12 is a threading element, which can be constructed as a blade, circular blade or in some other conventional form. The threading element 14 is firmly connected to the counter-surface 13 and in the embodiment shown is an integral part thereof. In other words, the counter-surface 13 and the threading element 14 form a unit, allocated to and in particular connected upstream of the cutting element 12. The unit consisting of counter-surface 13 and threading element 14 can be firmly connected to the cutting element 12 in such a way that movements of the cutting element 12 can be executed synchronously in a linear and/or non-linear direction. Alternatively the entire unit can also be constructed as movable relative to the cutting element 12.

In the embodiment shown (see in particular FIG. 1) the unit consisting of counter-surface 13 and threading element 14 is detachably fastened, preferably with screws 15, to a carrier element 16, on which the cutting element 12 is also arranged. The cutting element 12, constructed in this example as a circular blade 17, is arranged as rotatably drivable on the carrier element 16. The carrier element 16 is in turn arranged on a shaft element 18, which is a component of a swivel arrangement 19 (to be seen in particular in FIG. 3). The shaft element 18 has a rotational axis 20, about which it—and therefore also the carrier element 16—is swivellable. The shaft element 18 itself is held within a sleeve 21, which on its part is rigidly connected to a further sleeve 23 by struts 22 or such. Sleeve 23 is held as swivellable on an axle 24 in such a way that sleeve 23 is drivable swivellably about a rotational axis 25, wherein the rotational or swivel movements about the rotational axes 25 and 20 can also be superimposed. Additionally the swivel arrangement 19 or else parts thereof can be constructed as movable in a linear direction, namely movable up and down and/or in or opposite the transport direction T.

Details of the unit consisting of counter-surface 13 and threading element 14 emerge in particular from FIGS. 4 to 8. The counter-surface 13 is a flat, plate-like element with a slit 26, the width of the slit 26 being minimally larger than the width of the circular blade 17. Counter-surface 13 and circular blade 17 are arranged in respect of one another in such a way that the circular blade 17, though being inserted into the slit 26, does not exit on the side facing the transport element. The counter-surface 13 is constructed on the side of the slit 26 facing the fish fillet as sloping towards the centre (see in particular FIG. 8).

As an extension of the counter-surface 13 the threading element 14 extends opposite the transport direction T. The threading element 14 is likewise constructed as plate-like in the shape of a spatula or such. As emerges particularly from FIG. 6, the thickness of the material of the counter-surface 13 is greater than the thickness of the material of the threading element 14. Counter-surface 13 and threading element 14 are made in one piece from the same material, namely preferably of high-grade steel.

The threading element 14 is constructed as rounded on its free end 27 and at least on the side facing the fish fillet, but preferably constructed provided with a circumferential chamfer 28. The threading element 14 can be aligned with its central axis 29 in such a way that the central axis 29 runs parallel to the cutting plane $E_2$, spanned by the circular blade 17 (spanned by the X and Z coordinates as in FIG. 6) or at an angle α thereto. An alignment with an angle of approximately 20-40° is preferred. Other angle sizes are likewise possible, however. In FIG. 5, e.g. the angle α amounts to approximately 30°, the threading element 14 being directed outwards.

On the side of the counter-surface 13 opposite the threading element 14 is arranged a deflector element 30, which is likewise constructed in one piece or multiple pieces with the unit consisting of counter-surface 13 and threading element 14. The deflector element 30 comprises a wall element 31 which runs parallel to the cutting plane $E_2$ and a guide plate 32, extending diagonally in the space, guide plate 32 and wall element 31 being connected to one another or stabilised by a bridge 33. In the wall element 31 are bores 34 for detachable fastening to the carrier element 16 or the swivel arrangement 19. The guide plate 32 can be constructed in one part or multiple parts. A guide plate 32 of at least two parts, which has a firm first section connected to the counter-surface 13 and a second section movable relative to the first section, is preferred. The second section can be set in the vertical direction by swivel movement and/or linear movement in such a way that a gap between the lower edge of the guide plate 32 and the surface of the transport element 11 is changeable.

The method principle is explained in greater detail below using the figures for example fish fillets.

The fish fillets run into the apparatus in the transport direction T. Shortly before the fish fillet arrives in the area of the apparatus 10 and more precisely of the unit consisting of counter-surface 13 and threading element 14, the swivel arrangement 19 is swivelled in an idle or waiting position. This means that counter-surface 13 and threading element 14 are outside the transport area of the fish fillet. When the fish fillet is conveyed further in the transport direction T, the counter-surface 13 with the threading element 14 swivels inwards, this being shortly before the fish fillet has reached the cutting element 12. Because of the swivelling inwards of the threading element 14 towards the fish fillet, it is "lifted" laterally on to the counter-surface 13. Hereby, the effect that each fish fillet with its belly or back side pointing outwards in the direction of the threading element is arched slightly upwards away from the transport plane by the skin connection (see in particular FIG. 2), so that the threading element 14 can grip underneath the fish fillet, plays a particular role. However, because of the oblique position of the threading element 14, fish fillets lying completely flat on the transport element 11 can also be threaded. By the continuous drive of the transport element 11 the fish fillet is threaded by the threading element 14, guided on to the counter-surface 13 and there trimmed and/or cut by the circular blade 17. If, for example, a strip of fat located on the belly edge is cut from the fish fillet, this strip of fat is removed from the processing process laterally by the deflector element 30 and more precisely by the guide plate 32.

The method can also take place without the swivel movement, in that the fish fillet runs up against the threading element 14, constructed as tangent-bent. Because of the angle of the threading element 14 it is ensured that it acts at least partially laterally on the fish fillet, so that the fish fillet lies reliably on the counter-surface 13 for cutting and/or trimming.

The invention claimed is:

1. An apparatus for the automated processing of meat, comprising a conveyor belt transport element for transporting the meat, a cutting element for cutting and/or trimming the meat, a counter-surface for the cutting element and at least one control and/or regulating apparatus, which is in functional connection with the cutting element, characterized in that a threading element is mounted forwardly of the counter-surface adjacent the cutting element and directly above and in near contact with the conveyor belt transport element in a horizontal transport plane of the meat, said threading element being bent laterally from the counter-surface in the horizontal transport plane at a horizontal angle with respect to the counter-surface whereby an outer end of the threading element extends at least partially across and in said horizontal transport plane to at least partially lift one side of the meat prior to the meat reaching said counter-surface.

2. An apparatus according to claim 1, characterised in that the threading element is an integral component of the counter-surface.

3. An apparatus according to claim 1, characterized in that threading element is constructed as an extension of the counter-surface.

4. An apparatus according to claim 1, characterized in that the threading element is a spatula-like plate element and has an elongated shape, rounded at said outer end in said horizontal transport plane.

5. An apparatus according to claim 4, characterised in that the plate element is chamfered at least on a side facing the meat.

6. An apparatus according to claim 1, characterized in that a unit consisting of the counter-surface and the threading element is constructed as swivellable from a position outside of said conveyor belt transport element to a position over said conveyor belt transport element, independently with respect to said conveyor belt transport element.

7. An apparatus according to 6, characterised in that the unit consisting of the counter-surface and the threading element is swivellable about at least one rotational axis.

8. An apparatus according to claim 6, characterised in that the unit consisting of the counter-surface and the threading element is movable in a linear direction.

9. An apparatus according to claim 8, characterised in that a deflector element is arranged behind the counter-surface in the direction of transport.

10. A method for the automated processing of meat, comprising the steps of:
- transporting the meat into an area of a cutting element using a conveyor belt transport element,
- running the meat up against a counter-surface before the meat reaches the cutting element,
- cutting and/or trimming the meat by means of the cutting element and
- removing the meat, characterized in that the meat is threaded by a threading element mounted forwardly of the counter-surface adjacent the cutting element and directly above and in near contact with the conveyor belt transport element in a horizontal transport plane of the meat, the threading element being bent laterally from the counter-surface in the horizontal transport plane at a horizontal angle with respect to the counter-surface whereby an outer end of the threading element extends at least partially across and in the horizontal transport plane, before running up against the counter-surface, wherein the meat is at least partially lifted by the threading element from one side thereof and then guided on to the counter-surface.

* * * * *